US008944286B2

(12) United States Patent
Mehus et al.

(10) Patent No.: US 8,944,286 B2
(45) Date of Patent: Feb. 3, 2015

(54) MASS-BASED DISPENSING USING OPTICAL DISPLACEMENT MEASUREMENT

(71) Applicant: Ecolab USA Inc., St. Paul, MN (US)

(72) Inventors: Richard J. Mehus, Richfield, MN (US); Paul R. Kraus, Apple Valley, MN (US); Mihnea A. Popa, Inver Grove Heights, MN (US)

(73) Assignee: Ecolab USA Inc., St. Paul, MN (US)

( * ) Notice: Subject to any disclaimer, the term of this patent is extended or adjusted under 35 U.S.C. 154(b) by 102 days.

(21) Appl. No.: 13/686,322

(22) Filed: Nov. 27, 2012

(65) Prior Publication Data

US 2014/0144936 A1 May 29, 2014

(51) Int. Cl.
*G01G 13/00* (2006.01)
*B67D 7/06* (2010.01)

(52) U.S. Cl.
CPC .......... *B67D 7/06* (2013.01)
USPC .......... 222/58; 222/64; 222/77; 73/800

(58) Field of Classification Search
CPC ....... B65G 47/19; G01G 13/00; G01G 11/08; G01G 11/00; B01F 15/0445
USPC .......... 222/58, 52, 64, 55, 77; 73/800; 177/210 R; 422/105, 107
See application file for complete search history.

(56) References Cited

U.S. PATENT DOCUMENTS

| | | | |
|---|---|---|---|
| 33,861 | A | 12/1861 | Whitney |
| 1,985,615 | A | 12/1934 | Mitchell |
| 2,219,597 | A | 10/1940 | Lutz |
| 2,254,269 | A | 9/1941 | Clark et al. |
| 2,319,739 | A | 5/1943 | Kessler |
| 2,333,791 | A | 11/1943 | Hutchinson, Jr. |
| 2,594,975 | A | 4/1952 | Mylting |
| 2,714,472 | A | 8/1955 | Richardson |
| 2,990,707 | A | 7/1961 | Gerhardt et al. |
| 3,136,157 | A | 6/1964 | Seedet al. |
| 3,197,980 | A | 8/1965 | Marple |
| 3,412,254 | A | 11/1968 | Meyer-doering et al. |
| 3,447,906 | A | 6/1969 | Zimmerli |
| 3,526,334 | A | 9/1970 | Ashton et al. |

(Continued)

FOREIGN PATENT DOCUMENTS

| | | | |
|---|---|---|---|
| DE | 3933763 | A1 | 4/1991 |
| DE | 4419415 | A1 | 12/1995 |
| DE | 10016659 | | 10/2001 |
| DE | 10039408 | A1 | 12/2001 |
| EP | 0917906 | A1 | 5/1999 |

(Continued)

OTHER PUBLICATIONS

U.S. Appl. No. 10/436,454, by Richard J. Mehus, filed May 12, 2003.

(Continued)

*Primary Examiner* — Kevin P Shaver
*Assistant Examiner* — Robert Nichols, II
(74) *Attorney, Agent, or Firm* — Shumaker & Sieffert, P.A.

(57) ABSTRACT

A dispensing system and methods employed therein uses optical displacement sensing to control dispensation of one or more products. An optical displacement sensor measures displacement of a load beam supporting a vessel from which the product is to be dispensed. The displacement of the load beam is related to the amount (weight) of the product remaining in the vessel. The system may thus control dispensation of the product based on the optical displacement measurements.

7 Claims, 4 Drawing Sheets

(56) References Cited

U.S. PATENT DOCUMENTS 3,656,478 A 4/1972 Swersey
3,743,598 A 7/1973 Field
3,754,871 A 8/1973 Hessel et al.
3,760,166 A 9/1973 Adams et al.
3,772,193 A 11/1973 Nelli et al.
3,774,056 A 11/1973 Sample et al.
3,826,113 A 7/1974 Boraas et al.
3,826,408 A 7/1974 Berndt et al.
3,828,869 A 8/1974 Sellers
3,834,587 A 9/1974 Bengt et al.
3,969,934 A * 7/1976 Raskin .................... 73/862.637
4,040,515 A 8/1977 Hessel et al.
4,046,996 A 9/1977 Williams et al.
4,076,146 A 2/1978 Lausberg et al.
4,195,500 A 4/1980 Tobita et al.
4,199,001 A 4/1980 Kratz
4,211,517 A 7/1980 Schmid
4,222,496 A 9/1980 Start et al.
4,241,400 A 12/1980 Kiefer
4,247,396 A 1/1981 Buesing
4,265,266 A 5/1981 Kierbos et al.
4,307,787 A 12/1981 Raboud et al.
4,320,855 A 3/1982 Ricciardi et al.
4,334,784 A 6/1982 Engels
4,353,482 A 10/1982 Tomlinson et al.
4,373,418 A 2/1983 Rhodes et al.
4,396,828 A 8/1983 Dino et al.
4,402,426 A 9/1983 Faulkner et al.
4,404,639 A 9/1983 McGuire et al.
4,433,917 A 2/1984 Mendel et al.
4,463,844 A 8/1984 Huffman et al.
4,482,785 A 11/1984 Finnegan et al.
4,486,910 A 12/1984 Saalmann et al.
4,509,543 A 4/1985 Livingston et al.
4,513,796 A 4/1985 Miller et al.
4,526,215 A 7/1985 Harrison et al.
4,573,606 A 3/1986 Lewis et al.
RE32,101 E 4/1986 Ricciardi et al.
RE32,102 E 4/1986 Ricciardi et al.
4,597,091 A 6/1986 Blake
4,630,654 A 12/1986 Kennedy
4,632,198 A 12/1986 Uchimura
4,660,667 A 4/1987 Uchimura et al.
4,676,399 A 6/1987 Burckhardt
4,690,230 A 9/1987 Uchimura et al.
4,690,305 A 9/1987 Copeland
4,697,243 A 9/1987 Moore et al.
4,707,848 A 11/1987 Durston et al.
4,711,370 A 12/1987 Goudy, Jr. et al.
4,733,971 A 3/1988 Pratt
4,756,321 A 7/1988 Livingston et al.
4,766,548 A 8/1988 Cedrone et al.
4,770,859 A 9/1988 Heiser, Jr.
4,789,014 A 12/1988 DiGianfilippo et al.
4,826,661 A 5/1989 Copeland et al.
4,830,508 A 5/1989 Higuchi et al.
4,834,546 A 5/1989 Pütz
4,836,685 A 6/1989 Verreault
4,837,811 A 6/1989 Butler et al.
4,845,965 A 7/1989 Copeland et al.
4,848,381 A 7/1989 Livingston et al.
4,858,449 A 8/1989 Lehn
4,867,196 A 9/1989 Zetena et al.
4,867,343 A 9/1989 Ricciardi et al.
4,872,763 A 10/1989 Higuchi et al.
4,908,190 A 3/1990 Maglio et al.
4,938,240 A 7/1990 Lakhan et al.
4,964,185 A 10/1990 Lehn
4,967,811 A 11/1990 DiGianfilippo et al.
4,969,011 A 11/1990 Faull et al.
4,976,137 A 12/1990 Decker et al.
4,980,292 A 12/1990 Elbert et al.
4,999,124 A 3/1991 Copeland
5,014,211 A 5/1991 Turner et al.
5,014,877 A 5/1991 Roos
5,024,352 A 6/1991 Gmür et al.
5,036,479 A 7/1991 Prednis et al.
5,038,807 A 8/1991 Bailey et al.
5,040,699 A 8/1991 Gangemi
5,043,860 A 8/1991 Koether et al.
5,053,206 A 10/1991 Maglio et al.
5,064,094 A 11/1991 Roos et al.
5,115,842 A 5/1992 Crafts et al.
5,136,281 A 8/1992 Bonaquist
5,147,615 A 9/1992 Bird et al.
5,203,366 A 4/1993 Czeck et al.
5,208,930 A 5/1993 Chabard
5,219,224 A 6/1993 Pratt
5,222,027 A 6/1993 Williams et al.
5,240,326 A 8/1993 Evanson
5,268,153 A 12/1993 Muller
5,279,448 A 1/1994 Hanlin et al.
5,283,639 A 2/1994 Esch et al.
5,288,145 A 2/1994 Mackey et al.
5,294,022 A 3/1994 Earle
5,316,195 A 5/1994 Moksnes et al.
5,322,571 A 6/1994 Plummer et al.
5,332,311 A 7/1994 Volk, Jr. et al.
5,340,211 A 8/1994 Pratt
5,345,379 A 9/1994 Brous et al.
5,365,059 A * 11/1994 Savage ...................... 250/231.1
5,369,032 A 11/1994 Pratt
5,370,267 A 12/1994 Schroeder
5,389,344 A 2/1995 Copeland et al.
5,390,385 A 2/1995 Beldham
5,397,028 A 3/1995 Jesadanont
5,400,018 A 3/1995 Scholl et al.
5,404,893 A 4/1995 Brady et al.
5,407,598 A 4/1995 Olson et al.
5,411,716 A 5/1995 Thomas et al.
5,419,355 A 5/1995 Brennan et al.
5,427,748 A 6/1995 Wiedrich et al.
5,497,914 A 3/1996 Maltsis
5,500,050 A 3/1996 Chan et al.
5,505,915 A 4/1996 Copeland et al.
5,556,478 A 9/1996 Brady et al.
5,580,448 A 12/1996 Brandreth, III
5,584,025 A 12/1996 Keithley et al.
5,584,079 A 12/1996 Wong et al.
5,609,417 A 3/1997 Otte
5,619,183 A 4/1997 Ziegra et al.
5,625,659 A 4/1997 Sears et al.
5,625,908 A 5/1997 Shaw
5,636,008 A 6/1997 Lobiondo et al.
5,638,417 A 6/1997 Boyer et al.
5,671,262 A 9/1997 Boyer et al.
5,679,173 A 10/1997 Hartman
5,681,400 A 10/1997 Brady et al.
5,694,323 A 12/1997 Koropitzer et al.
5,695,091 A 12/1997 Winings et al.
5,724,261 A 3/1998 Denny et al.
5,745,381 A 4/1998 Tanaka et al.
5,757,664 A 5/1998 Rogers et al.
5,758,300 A 5/1998 Abe
5,759,501 A 6/1998 Livingston et al.
5,761,278 A 6/1998 Pickett et al.
5,762,096 A 6/1998 Mirabile
5,769,536 A 6/1998 Kotylak
5,777,895 A 7/1998 Kuroda et al.
H1743 H 8/1998 Graves et al.
5,821,523 A 10/1998 Bunte et al.
5,826,749 A 10/1998 Howland et al.
5,827,486 A 10/1998 Crossdale
5,839,097 A 11/1998 Klausner
5,851,291 A 12/1998 Poterala et al.
5,861,881 A 1/1999 Freeman et al.
5,864,783 A 1/1999 Struck et al.
5,875,430 A 2/1999 Koether
5,885,446 A 3/1999 McGrew
5,887,975 A 3/1999 Mordaunt et al.
5,897,671 A 4/1999 Newman et al.
5,902,749 A 5/1999 Lichtwardt et al.
5,913,915 A 6/1999 McQuinn
5,939,974 A 8/1999 Heagle et al.

(56) References Cited

U.S. PATENT DOCUMENTS

| | | | | |
|---|---|---|---|---|
| 5,979,703 | A | 11/1999 | Nystrom | |
| 5,987,105 | A | 11/1999 | Jenkins et al. | |
| 5,992,686 | A | 11/1999 | Cline et al. | |
| 6,003,070 | A | 12/1999 | Frantz | |
| 6,007,788 | A | 12/1999 | Bellon et al. | |
| 6,012,041 | A | 1/2000 | Brewer et al. | |
| 6,029,286 | A | 2/2000 | Funk | |
| 6,049,792 | A | 4/2000 | Hart et al. | |
| 6,061,668 | A | 5/2000 | Sharrow | |
| 6,073,124 | A | 6/2000 | Krishnan et al. | |
| 6,082,149 | A | 7/2000 | Woods et al. | |
| 6,098,843 | A | 8/2000 | Soberanis et al. | |
| 6,120,175 | A | 9/2000 | Tewell | |
| 6,129,449 | A | 10/2000 | McCain et al. | |
| 6,133,555 | A | 10/2000 | Brenn | |
| 6,136,184 | A | 10/2000 | King | |
| 6,143,257 | A | 11/2000 | Spriggs et al. | |
| 6,164,189 | A | 12/2000 | Anson | |
| 6,167,358 | A | 12/2000 | Othmer et al. | |
| 6,220,312 | B1 | 4/2001 | Hirsch et al. | |
| 6,234,218 | B1 | 5/2001 | Boers | |
| 6,259,956 | B1 | 7/2001 | Myers et al. | |
| 6,294,342 | B1 * | 9/2001 | Rohr et al. | 435/7.1 |
| 6,321,204 | B1 | 11/2001 | Kazami et al. | |
| 6,330,499 | B1 | 12/2001 | Chou et al. | |
| 6,380,495 | B1 | 4/2002 | Ash et al. | |
| 6,418,371 | B1 | 7/2002 | Arnold | |
| 6,438,471 | B1 | 8/2002 | Katagishi et al. | |
| 6,441,322 | B1 | 8/2002 | Ash et al. | |
| 6,463,940 | B1 | 10/2002 | Thomas et al. | |
| 6,472,615 | B1 | 10/2002 | Carlson | |
| 6,490,513 | B1 | 12/2002 | Fish et al. | |
| 6,507,966 | B1 | 1/2003 | Mitchell et al. | |
| 6,513,964 | B1 | 2/2003 | Himmelright et al. | |
| 6,547,097 | B1 | 4/2003 | Cavallaro et al. | |
| 6,561,381 | B1 | 5/2003 | Osterheld et al. | |
| 6,697,706 | B2 | 2/2004 | Gardner et al. | |
| 6,707,873 | B2 | 3/2004 | Thompson et al. | |
| 6,719,453 | B2 | 4/2004 | Cosman et al. | |
| 6,792,395 | B2 | 9/2004 | Roberts | |
| 6,845,298 | B2 | 1/2005 | Nelson et al. | |
| 6,896,140 | B1 | 5/2005 | Perry | |
| 6,987,228 | B1 | 1/2006 | MacMichael et al. | |
| 7,069,188 | B2 | 6/2006 | Roberts | |
| 7,128,215 | B2 | 10/2006 | Danechi | |
| 7,201,290 | B2 | 4/2007 | Mehus et al. | |
| 7,410,623 | B2 | 8/2008 | Mehus et al. | |
| 7,891,523 | B2 | 2/2011 | Mehus et al. | |
| 7,896,198 | B2 | 3/2011 | Mehus et al. | |
| 2001/0038018 | A1 | 11/2001 | Bell et al. | |
| 2001/0039501 | A1 | 11/2001 | Crevel et al. | |
| 2001/0047214 | A1 | 11/2001 | Cocking et al. | |
| 2001/0049846 | A1 | 12/2001 | Guzzi et al. | |
| 2001/0053939 | A1 | 12/2001 | Crevel et al. | |
| 2001/0054038 | A1 | 12/2001 | Crevel et al. | |
| 2002/0014496 | A1 | 2/2002 | Cline et al. | |
| 2002/0104381 | A1 * | 8/2002 | Debesis et al. | 73/800 |
| 2003/0031084 | A1 | 2/2003 | Bartos | |
| 2003/0033156 | A1 | 2/2003 | McCall | |
| 2003/0033396 | A1 | 2/2003 | McCall | |
| 2003/0043688 | A1 | 3/2003 | Peterson et al. | |
| 2003/0121561 | A1 | 7/2003 | Wagner et al. | |
| 2003/0195656 | A1 | 10/2003 | Gardner | |
| 2004/0015269 | A1 | 1/2004 | Jungmann et al. | |
| 2004/0088076 | A1 | 5/2004 | Gardner | |
| 2004/0162850 | A1 | 8/2004 | Sanville et al. | |
| 2004/0216500 | A1 | 11/2004 | Aouad | |
| 2004/0220844 | A1 | 11/2004 | Sanville et al. | |
| 2004/0226755 | A1 | 11/2004 | Pottebaum et al. | |
| 2004/0226959 | A1 | 11/2004 | Mehus et al. | |
| 2004/0230339 | A1 | 11/2004 | Maser et al. | |
| 2004/0232163 | A1 | 11/2004 | Reinsch et al. | |
| 2005/0065644 | A1 | 3/2005 | Gardner | |
| 2005/0102059 | A1 | 5/2005 | Gardner et al. | |
| 2005/0144737 | A1 | 7/2005 | Roepke et al. | |
| 2005/0269348 | A1 | 12/2005 | Limback et al. | |
| 2006/0173576 | A1 | 8/2006 | Goerg et al. | |
| 2007/0000291 | A1 | 1/2007 | France et al. | |
| 2008/0058771 | A1 | 3/2008 | DeBrabanter | |
| 2008/0271928 | A1 | 11/2008 | Mehus et al. | |
| 2009/0126123 | A1 | 5/2009 | Kim et al. | |
| 2009/0151474 | A1 | 6/2009 | Mehus et al. | |
| 2011/0037987 | A1 * | 2/2011 | Gurny et al. | 356/496 |
| 2011/0165034 | A1 * | 7/2011 | Carlson et al. | 422/261 |
| 2014/0158707 | A1 * | 6/2014 | Veltrop et al. | 222/1 |

FOREIGN PATENT DOCUMENTS

| | | | |
|---|---|---|---|
| GB | 2052251 | A | 12/1983 |
| GB | 2120563 | A | 12/1983 |
| JP | 359142832 | A | 8/1984 |
| JP | 360020122 | A | 2/1985 |
| JP | 360150823 | A | 8/1985 |
| JP | 361098657 | A | 6/1986 |
| JP | 362168529 | A | 7/1987 |
| JP | 363001434 | A | 1/1988 |
| JP | 401145525 | A | 6/1989 |
| JP | 401148916 | A | 6/1989 |
| JP | 401207124 | A | 8/1989 |
| JP | 404049110 | A | 2/1992 |
| WO | 98/26704 | A1 | 6/1998 |
| WO | 03/059143 | A1 | 7/2003 |

OTHER PUBLICATIONS

Prosecution history from U.S. Appl. No. 10/437,257, dated Mar. 8, 2005, through Dec. 1, 2006, 91 pp.

Prosecution history from U.S. Appl. No. 10/843,230, dated Feb. 9, 2007, through Dec. 17, 2010, 176 pp.

Prosecution history from U.S. Appl. No. 10/843,219, dated Feb. 9, 2007, through May 1, 2008, 94 pp.

Prosecution history from U.S. Appl. No. 11/713,964, dated Mar. 10, 2010, through Nov. 19, 2011, 36 pp.

Nova Controls, Nova News, "Save Money *and* Gain Sales Features?" Aug. 12, 1992, 1 pg.

Novalink™ OverView™ Program Pricing, undated, 1 pg.

Nova Controls, "Orion Liquid Laundry Supply Dispenser," Feb. 1989, 5 pp.

Novalink™ Laundry Information System, ControlMaster Version 2.0 for Windows User's Guide, 2000, 39 pp.

Persyst Inc., "LDAS-2000 Remote Information Control and Management System for the Commercial Laundry and Vending Industry," undated, 4 pp.

Persyst Inc., "Dial-A-Wash Automatic Laundry Room Attendant for Apartment and Complex Laundry Rooms," undated, 2 pp.

PowerPoint Presentation: "ECOLAB® Aramark Uniform Services Joining Forces for Service Excellence," 1998, 69 pp.

T-Jet™ 2000 PC, "Wash-Aisle Productivity Manager Software Guide," ECOLAB® Textile Care Division, undated, 29 pp.

Sample Reports, Nova Controls, Oct. 1997, 8 pp.

Sample Reports, NOVALINK™ System, Jan. 1996, 9 pp.

Nexgen Si, Inc., "*InTouch* Water Treatment Information Management Solution," Mar. 29, 1999, 59 pp.

NOVALINK™ brochure: "Laundry Information System: Overview Reports," Dec. 13, 1995, 6 pp.

Diversey, Diverlog-L Enhanced "DLE—Production Summary Reports," Apr. 1990, 5 pp.

Diversey, Diverlog-L Enhanced "DLE Set-up Report," Apr. 1990, 7 pp.

Diversey, Diverlog-L Enhanced "DLE—Single Cycle Reports," Mar. 1990, 5 pp.

Clax Diverflow System, "Advanced Central Dosing Technology for Laundries," copyright DiverseyLever 1998, 3 pp.

ECOLAB® Inc., product brochure: "We'd like to make a couple of things perfectly Clear," copyright 1998, 4 pp.

ECOLAB® balancer. com, MRE, Jun. 4, 1997, 4 pp.

ECOLAB® Inc., product brochure: "relax. We've Got Your Pool Concerns Under Control," copyright 1998, 4 pp.

* cited by examiner

MASS-BASED DISPENSING USING OPTICAL DISPLACEMENT MEASUREMENT

TECHNICAL FIELD

The disclosure relates generally to dispensing systems and methods.

BACKGROUND

Dispensing systems to dispense an ingredient for a commercial purpose have been widely used in many industries. For example, in the restaurant industry, warewashing systems are employed to rapidly wash large quantities of eating utensils, plates, pots, pans, glassware, etc. In another example in the hotel industry, linens, towels, clothing, and the like are washed in commercial cleaning systems. Such systems commonly employ dispensers to dispense chemicals, such as detergents, to effectively perform the washing function.

Many types of dispensers and control systems for such dispensers have been utilized. Such dispensers, control systems, and methods for controlling such dispensers have utilized a variety of techniques. As one example, such methods may dispense a predetermined amount of the ingredient into the cleaning apparatus for each cycle of the apparatus. Other systems and methods attempt to determine when the ingredient needs to be replenished in the cleaning apparatus by measuring a characteristic of the cleaning apparatus, e.g., measuring the conductivity of a use solution to determine when additional detergent needs to be added.

SUMMARY

In general, the disclosure relates to dispensation of chemical products.

In one examples, the disclosure is directed to a system comprising a load beam that supports a vessel containing a product to be dispensed, a product dispenser that dispenses the product based on a weight of the product remaining in the vessel, an optical displacement sensor that measures a displacement of the load beam, wherein the displacement of the load beam is related to the weight of the product remaining in the vessel, and a controller that receives the measured displacement of the load beam and determines a dispensed amount of the product based on the displacement of the load beam. In some examples, the product may be a chemical product. In some examples, the product may be one of a solid concentrate, an extruded solid, a pressed solid, a liquid, a gel, a paste, a powder, tablets, pellets, or a unit dose form of chemical product.

In another example, the disclosure is directed to a system comprising a load beam that supports a vessel containing a product to be dispensed, a product dispenser that dispenses the product based on a weight of the product remaining in the vessel, an emitter that emits an optical signal toward the load beam, wherein the optical signal is reflected from the load beam at an angle determined by a distance between the emitter and the load beam, a detector that receives the reflected signal at a location based at least in part on the reflected angle of the optical signal and generates a detector signal corresponding to the location, and a controller that initiates dispensation of the product dispense by the product dispenser; periodically, during dispensation of the product, receives the detector signal and determines therefrom a current displacement of the load beam from a reference position; calculates a current amount of product dispensed based on the current displacement of the load beam; compares the current amount
of product dispense with a target amount; and stops dispensation of the product if the current amount of product dispensed is within a predetermined threshold of the target amount.

In another example, the disclosure is directed to a method comprising supporting, on a load beam, a vessel containing a product to be dispensed, dispensing the product from the vessel upon initiation of a dispense cycle, emitting an optical signal toward the load beam, wherein the optical signal is reflected from the load beam at an angle determined by a distance between the emitter and the load beam, receiving the reflected signal at a location based at least in part on the reflected angle of the optical signal, generating a detector signal corresponding to the location, receiving the detector signal and determining therefrom a current displacement of the load beam from a reference position, calculating a current amount of the product dispensed based on the current displacement of the load beam, comparing the current amount of the product dispensed with a target amount, and stopping the dispensing of the product if the current amount of the product dispensed is within a predetermined threshold of the target amount.

The details of one or more examples are set forth in the accompanying drawings and the description below. Other features and advantages will be apparent from the description and drawings, and from the claims.

DETAILED DESCRIPTION

Figure 1:
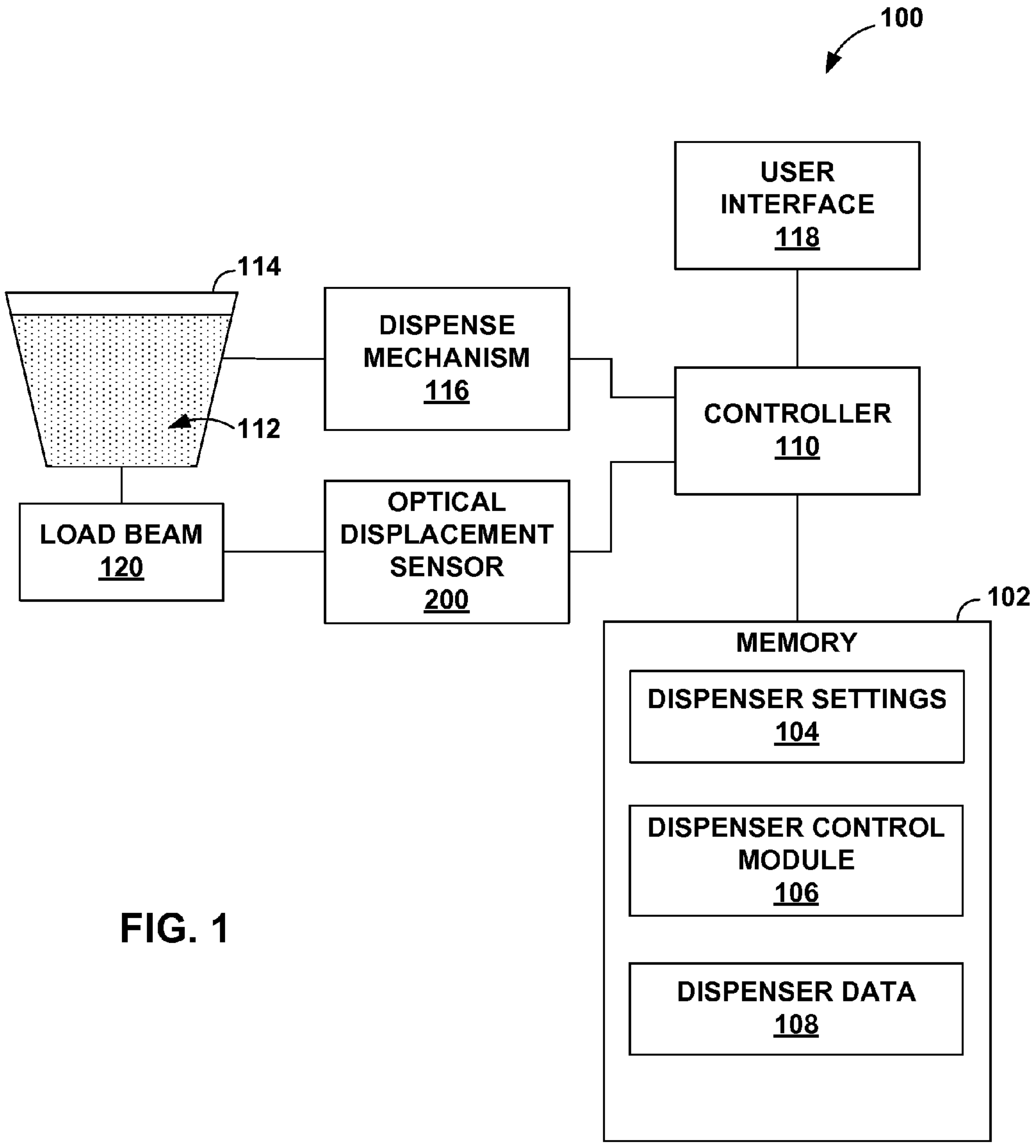
FIG. 1 is a block diagram illustrating an example mass-based dispensing system that uses optical displacement sensing to determine the amount of product dispensed.

FIG. 1 is a block diagram illustrating an example mass-based dispensing system 100 that uses optical displacement sensing to control dispensation of one or more products. A product 112 to be dispensed may include, for example, a solid, a liquid, a paste, a gel, a powder, a tablet, or any other product form factor. Product 112 may include a chemical product, a food product, a cleaning, disinfecting, or sanitizing product, an agricultural product, a manufacturing product, etc. Although specific examples of products 112 have been listed, it shall be understood that product 112 may include any type of product for which controlled dispensation is desired.

In general, system 100 controls dispensation of the product 112 by measuring the mass (e.g., weight) of product 112 remaining in the dispenser. Dispensing system 100 includes a housing or container 114 that stores a supply of product 112 and from which product 112 may be dispensed. In general, by measuring the mass of container 114 both before and at one or more times during a dispensing cycle, the amount of product dispensed may be determined, and thus the amount of product 112 dispensed during the dispensing cycle may be controlled.

In this example, a structural element, such as a load beam 120, is positioned such that the mass of the container 114 and the amount of product 112 remaining therein is supported by a free end of load beam 120. The amount of deflection of the load beam is related to the magnitude of the load applied, e.g., the mass of the container 114 and the amount of product 112 remaining therein.

Dispensing system 100 further includes a controller 100, a user interface 110, a memory 102, a dispense mechanism 116, and an optical displacement sensor 200. Controller 100 manages dispensing of product 112 by controlling dispense mechanism 116. Dispense mechanism 116 may include any type of dispense mechanism depending at least in part upon the type of product 112 to be dispensed. For example, dispense mechanism 116 may include an electronically controllable valve that opens and closes to dispense a fluid or liquid product; a dispenser that sprays a solid block of a chemical product with a diluent to create a use solution; a pellet dispenser; a vibration-type dispenser; a pump; a powder dispenser; a tablet dispenser; a flow meter; or any other electronically controllable dispense mechanism.

Optical displacement sensor 200 measures the amount of deflection of load beam 120 at one or more times throughout the product dispense cycle. Memory 102 stores the data and control software that governs operation of the controller 23. For example, memory 102 may include dispenser settings 104 that specify target amounts for one or more product(s) to be dispensed; timing, sequences and amounts of one or more products to be dispensed; and/or other relevant dispenser settings. Memory 102 may also include a dispenser control module 106 that permits by controller 100 to manage dispensing of the chemical product during a dispense cycle based on information received from the optical displacement sensor 200. For example, controller 100 may determine the amount of product dispensed at one or more times during a dispensing cycle based on information received from optical displacement sensor 200, and may control dispense mechanism 116 such that a target amount of product 112 is dispensed during the dispensing cycle. Dispenser data 108 may include data received from optical displacement sensor 200; data regarding amounts of chemical products dispensed during one or more dispensing cycles; times, dates, and other relevant information concerning one or more dispensing cycles; dispenser identification or serial numbers; types of products which the dispenser is authorized to dispense; or any other data that may be relevant to operation of dispensing system 100.

As discussed above, product 112 to be dispensed may be loaded into a container 114, which may include any one or more of a housing, reservoir, tank, tray, hopper, etc. Product 112 may be contained within a product capsule, bag, box, canister, or other product packaging. Product may include a solid concentrate; an extruded solid; a pressed solid; a liquid; a gel; a powder; a paste; may take the form of tablets, pellets or other form of unit dose of the chemical product; or may be any other form of chemical product known or will be known to those of skill in the art. In general, the disclosure is not limited with respect to the form of the chemical product and/or the particular dispense mechanism by which they are dispensed. Rather, it shall be understood that the disclosure relates generally to mass or mass-based dispensation of chemical product, regardless of the form of the chemical product or the particular mechanism by which the chemical product is dispensed. Thus, for example, solid products (whether extruded, pressed, or other form of solid product) may be dispensed via erosion with a diluent, chipping, blocking or cutting; liquids or gels may be dispensed via pumping or via gravity from a chemical product container or, if loaded directly into the dispenser, from a reservoir within the dispenser; pastes may be dispensed from a squeeze tube; tablets or pellets may be dispensed via a mechanical mechanism for releasing tablets or pellets; powders may be dispensed from a product capsule or from a reservoir within a product container, etc. Any chemical products/dispensers may incorporate mass or weight-based dispensing, and the optical displacement sensing described herein may thus be incorporated into any of such chemical product dispensing systems.

In addition, although an example mass or weight based dispensing system utilizing a load beam as the mechanism for determining the mass or weight of the chemical product is described above, it shall be understood that other implementations may also be used, and that the disclosure is not limited in this respect.

Figure 2:
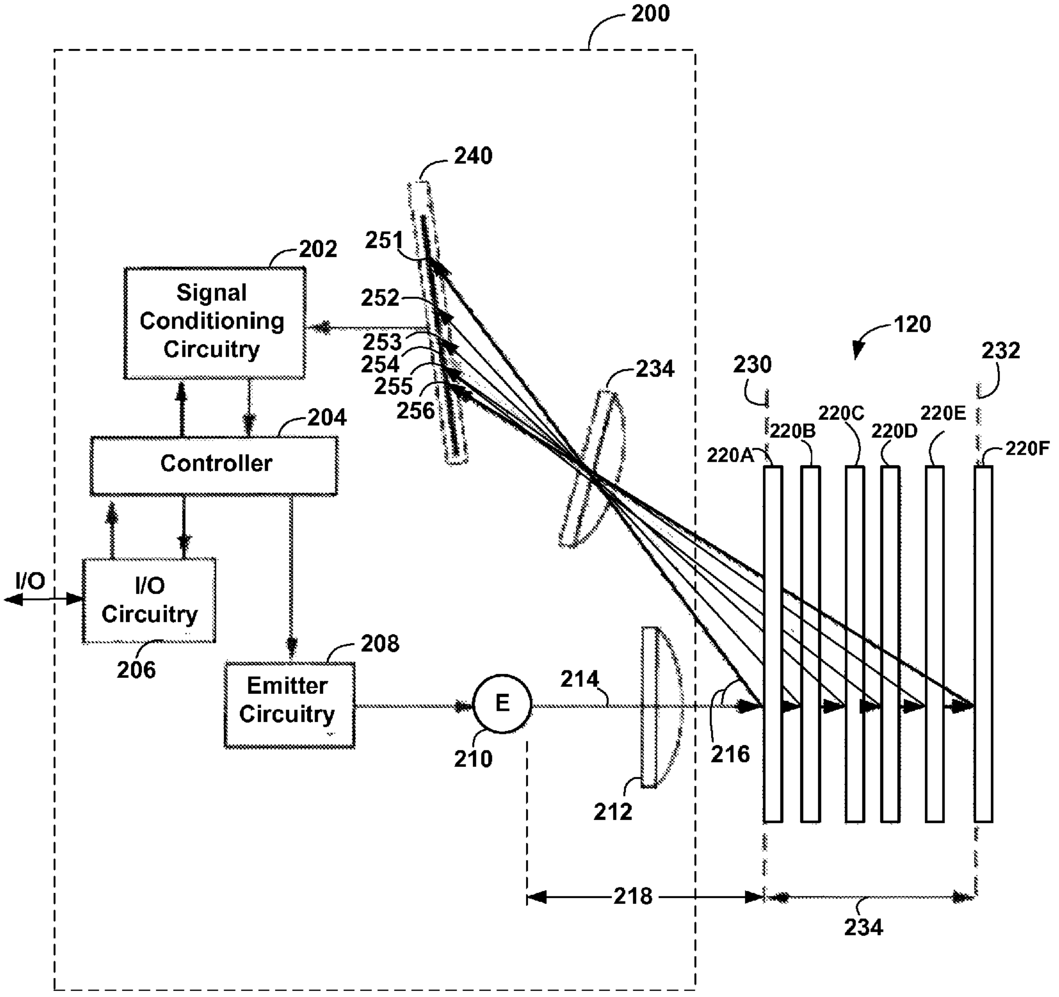
FIG. 2 is a diagram illustrating an example optical displacement measurement sensor.

FIG. 2 is a diagram illustrating an example optical displacement sensor 200. In this example, sensor 200 measures optical displacement of a load beam, such as load beam 120 of FIG. 1. In some examples, the system may be designed such that, during normal operation, the size (i.e., weight) of the load to be applied to load beam 120 falls within a linear stress-strain portion of the beam material. That is, the amount of deflection per unit weight is linear between the minimum and maximum load to be applied. An example of the range of displacement is indicated in FIG. 2, where reference numeral 230 represents the position of the load beam at the minimum load to be applied (e.g., 0 or some other calibrated amount) and reference numeral 232 represents the position of the load beam at the maximum load to be applied (e.g., the maximum rated load of the dispenser). The range between the minimum and maximum displacement of the load beam is indicated in this example by reference numeral 234. FIG. 2 shows load beam 120 at multiple displacement positions, 220A (the minimum in this example), 220B, 220C, 220D, 220E, and 220F (the maximum in this example).

In this example, optical displacement sensor 200 operates based on the principle of triangulation. In general, given the known relative positions of a light source and a detector, the position of a target (e.g., the load beam) may be calculated by determining the location of the reflected beam spot on the detector. To that end, optical displacement sensor 200 includes a microprocessor 204, an optical emitter 210, and a detector 240. Optical emitter 210 may include, for example, a laser emitter or other collimated light source. The location of the reflected beam spot on detector 240 will change based on the displacement of the load beam. Based on this information, microprocessor 204 may determine the distance from the emitter to the target. This distance, the displacement (difference) from one or more previous positions, and/or the displacement from a reference position may then be analyzed by the dispenser controller (e.g., dispenser controller 110 as shown in FIG. 1) to determine the current amount (weight) of product remaining in the dispenser 100, and/or to determine the amount of product dispensed.

As shown in FIG. 2, an optical signal 214 generated by emitter 210 is applied, via a lens 212, to a target. In this example, the target is a load beam under deflection from a product container as shown in FIG. 1. The amount of load beam deflection determines the distance from the emitter 210 to the target. As the load increases, the amount of load beam deflection increases and thus the distance between the emitter and the load beam increases. For example, under the maximum rated load the load beam may be deflected to a position indicated by reference numeral 220F. Successively smaller loads resulting from dispensation of product 112 may cause the load beam to be deflected to a correspondingly lesser degree toward the minimum position indicated by reference numeral 220A.

The optical signal 214 is reflected from the load beam at an angle determined by a distance between the emitter and the load beam. An example of this angle for position 220A is indicated by reference numeral 216. The light reflected from the load beam is collected by a receiver lens 214 and focused on detector 240. As the distance to the target changes, the angle of the reflected light passing through receiver lens 214 changes, and the reflected signal is focused on a different position on detector 240. Detector 240 thus receives the reflected signal at a location based at least in part on the reflected angle of the optical signal. For example, light reflected from a load beam at the position indicated by reference numeral 232 may be focused at location 256 on detector 240. Light reflected from a load beam at the position indicated by reference numeral 220D may be focused at location 255 on detector 240. Light reflected from a load beam at the position indicated by reference numeral 220C may be focused at location 254 on detector 240. Light reflected from a load beam at the position indicated by reference numeral 220B may be focused at location 253 on detector 240. Light reflected from a load beam at the position indicated by reference numeral 220A may be focused at location 252 on detector 240. Light reflected from a load beam at the position indicated by reference numeral 230 may be focused at location 251 on detector 240.

Detector 240 generates a detector signal corresponding to the location at which the reflected signal is focused. Signal conditioning circuitry 202 receives the detector signal and amplifies, filters, or otherwise prepares the detector signal for receipt by processor 204. Processor 204 receives the detector signal and may determine therefrom the distance between the emitter and the load beam. This distance for position 220A is indicated in FIG. 2 by reference numeral 218. Processor 204 may further determine, for example, the displacement of the load beam from a reference position, and/or the displacement of the load beam from one or more previous positions. I/O (input/output) circuitry 206 provides any buffering or amplifying of signals transmitted or received by optical displacement sensor 200.

In some examples, detector 240 may be implemented using a CCD (charge-coupled device), CMOS (complementary metal-oxide-semiconductor), or other image sensing technology. In one example, light receiving element 242 is a Linearized-CCD available from Keyence Corporation of America, Elmwood Park, N.J. In another example, optical displacement sensor 200 may be implemented using a laser displacement sensor also available from Keyence Corporation of America. However, it shall be understood that any appropriate detector or optical displacement sensor 200 or any of the components may be used, and that the disclosure is not limited in this respect.

As mentioned above, load beam 120 may be designed such that the range of loads to be applied to the load beam falls within a linear stress-strain portion of the beam material. That is, the amount of deflection per unit weight is linear between the minimum and maximum load to be applied. The load beam may be implemented using a chemically inert material to help reduce the potential for reaction between the product to be dispensed and the load beam itself, which may cause corrosion and affect the response of the load beam. For example, the load beam may be made of any chemically inert, rigid, or semi-rigid material including aluminum or other metals, plastics, ceramics, or other non-reactive machinable materials. In one example, load beam 120 may be made from a machinable ceramic. In another example, load beam 120 may be made from a thermoplastic or organic polymer thermoplastic material, such as a polyether ether ketone (PEEK). However, it shall be understood that load beam 120 may be formed from any suitable material, and that the disclosure is not limited in this respect.

Figure 3:
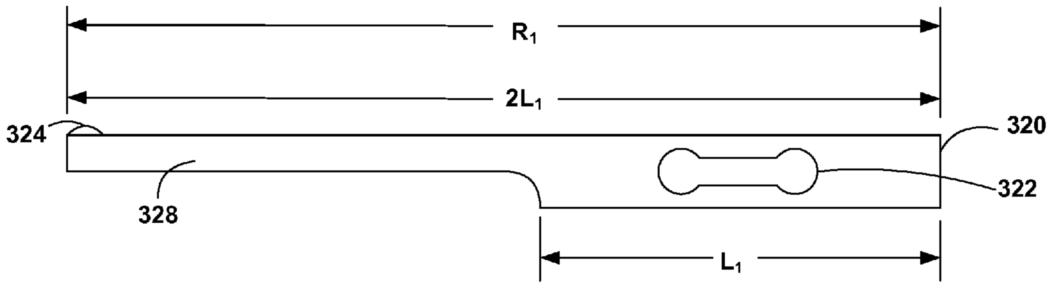
FIG. 3 is a diagram illustrating an example of a chemically inert load beam.

FIG. 3 is a diagram illustrating an example of a chemically inert load beam 320. In this example, load beam 320 includes a beam extension 328 having a target 324. The load (e.g., product container) may be supported by the beam extension 328. In this example, the laser beam or other collimated light source 214 (see, e.g., FIG. 2) may be focused on target 324 to provide increased reflectivity of the load beam. Load beam 320 may further include a cut-out portion 322 of varying sizes and/or shapes that may determine the maximum and minimum rated loads of load beam 320.

Figure 4:
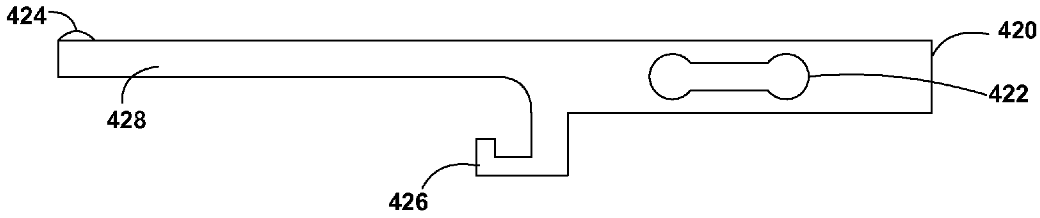
FIG. 4 is a diagram illustrating another example of a chemically inert load beam.

FIG. 4 is a diagram illustrating another example of a chemically inert load beam 420. In this example, load beam 420 includes a hook portion 426 that permits hanging of a product container. In addition, example load beam 420 also includes an extension portion 428 that may support a load (e.g., product container). Load beam 420 may further include a cut-out portion 422 of varying size and/or shape that may determine the capacity of load beam 420.

Figure 5:
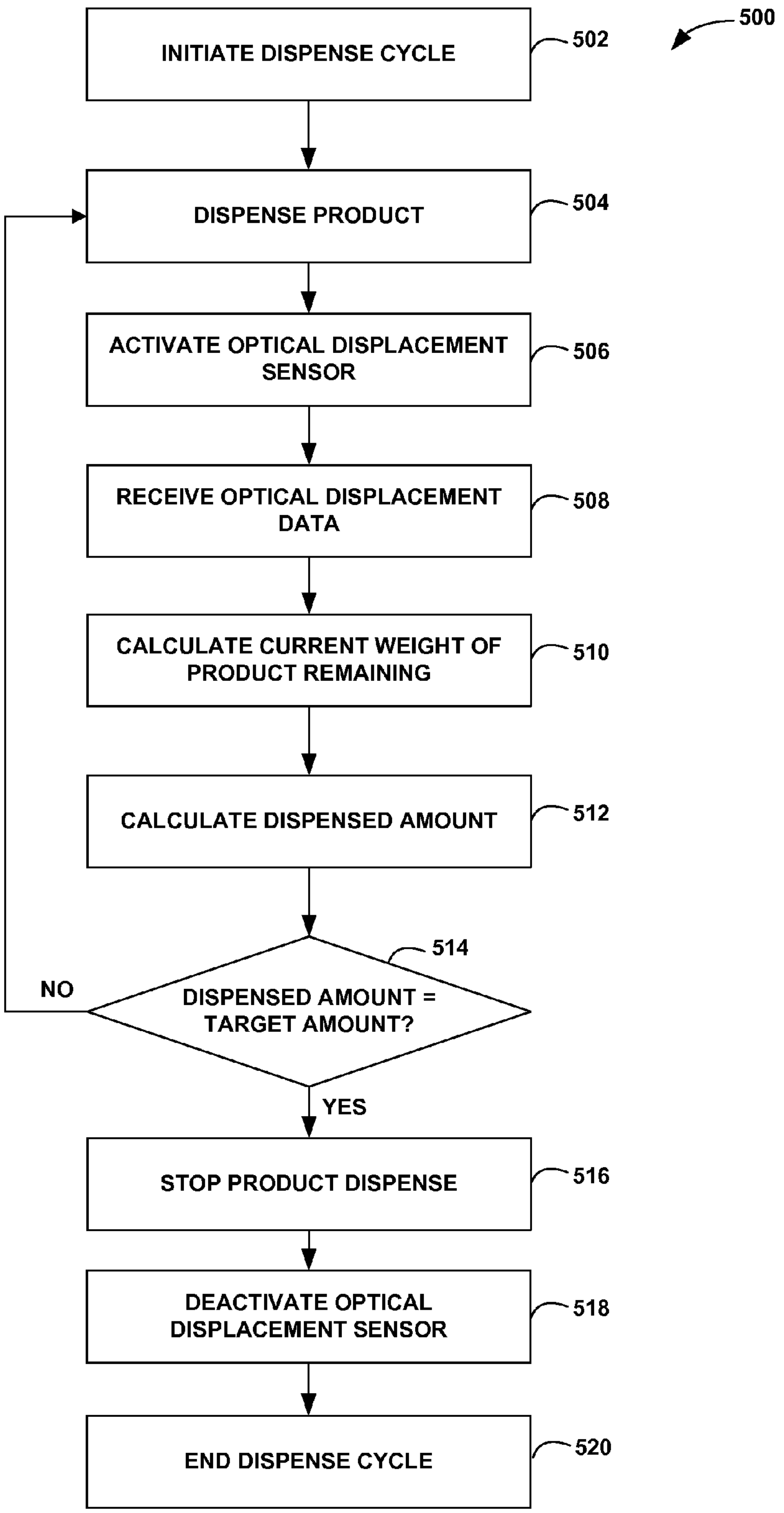
FIG. 5 is a flowchart illustrating an example process by which a system may utilize optical displacement to control dispensation of one or more products.

FIG. 5 is a flowchart illustrating an example process 500 by which a system, such as system 100 of FIG. 1, may utilize measurement of optical displacement to control dispensation of one or more products. Process (500) may be executed by a system controller (such as controller 110 of FIG. 1) to control and manage dispensation of one or more products based on measurement of optical displacement. In this example, the controller initiates a dispense cycle (502). This may be in response to a dispense request issued by a user, a dispense request from a piece of equipment requesting product, etc. Dispense cycles may also be automatically issued periodically or at predetermined times. The controller manages dispensation of the product (504). For example, the controller may generate and send a control signal to an electronically controller product dispenser to cause the dispenser to dispense the product. The product may be dispensed via any known means of product dispensing, including, but not limited to dispensation of liquids, solids, gels, tablets, powders, or any other form of product dispensation that may be electronically controlled.

The controller activates an optical displacement sensor (506). The optical displacement sensor measures the optical displacement of a target, such as a load beam that bears the weight of a product container, hopper, or other vessel from which the product is to be dispensed (referred to herein generally as the product container, regardless of whether or not a product container is actually used). The controller receives optical displacement data from the optical displacement sensor (508). The controller may then calculate the current weight of the product remaining in the product container based on the optical displacement data (510). For example, the system may store calibration information that relates various optical displacement measurements to the weight of the product remaining, or to the amount (weight) of product dispensed. For example, the system may include a look up table that associates optical displacement measurements to weights of product remaining, or the weight of the product dispensed. As another example, the system may include a formula from which the amount of product remaining, or the weight of the product dispensed, may be calculated based on the optical displacement measurement. As another example, the system may include a graphical or other relationship from which the amount of product remaining, or the weight of the product dispensed, may be determined based on the optical displacement measurement. The lookup table, formula, graphical or other relationship may be stored in a memory, such as memory 102 in FIG. 1, as part of dispenser settings 104 or other area of memory.

The system may then calculate the dispensed amount (512). For example, the system may subtract the current weight of the product remaining from the weight of the product remaining at the end of the previous dispense cycle to determine the amount that has been dispensed thus far into the dispense cycle. If the dispensed amount does not equal a target amount, or is not within a predetermined threshold of the target amount (514), the system continues to dispense the product, receive the optical displacement data, calculate the current weight of the product remaining, and calculate the dispensed amount.

When the dispensed amount equals a target amount, or is within a predetermined threshold of the target amount (514), the system stops the product dispense (516), deactivate the optical displacement sensor (518), thus ending the dispense cycle (520).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various examples have been described. These and other examples are within the scope of the following claims.

The invention claimed is:

1. A system comprising:

a load beam that supports a vessel containing a product to be dispensed, wherein the load beam includes a beam extension adapted to support the vessel containing the product to be dispensed, and a hook portion adapted to permit hanging of the vessel containing the product to be dispensed;

a product dispenser that dispenses the product based on a weight of the product remaining in the vessel;

an emitter that emits an optical signal toward the load beam, wherein the optical signal is reflected from the load beam at an angle determined by a distance between the emitter and the load beam;

a detector that receives the reflected signal at a location based at least in part on the reflected angle of the optical signal and generates a detector signal corresponding to the location; and a controller that initiates dispensation of the product dispensed by the product dispenser;

periodically, during dispensation of the product, receives the detector signal and determines therefrom a current displacement of the load beam from a reference position; calculates a current amount of product dispensed based on the current displacement of the load beam; compares the current amount of product dispensed with a target amount; and stops dispensation of the product if the current amount of product dispensed is within a predetermined threshold of the target amount.

2. The system of claim 1 wherein the product is a chemical product.

3. The system of claim 1 wherein the product is one of a solid concentrate, an extruded solid, a pressed solid, a liquid, a gel, a paste, a powder, tablets, pellets, or a unit dose form of chemical product.

4. The system of claim 1 wherein the controller calculates a current weight of product remaining in the vessel based on the displacement of the load beam, and subtracts the current weight of product remaining in the vessel from a weight of product remaining at a beginning of the product dispense cycle to determine the current amount of product dispensed.

5. The system of claim 1 wherein the product dispenser dispenses the product by applying a diluent to the chemical product.

6. The system of claim 1 wherein the emitter is a laser emitter and the optical signal is a laser beam.

7. A method comprising:

providing a load beam including a beam extension adapted to receive a vessel containing a product to be dispensed and a hook portion adapted to permit hanging of the vessel containing the product to be dispensed;

supporting, by the load beam, a vessel containing a product to be dispensed;

dispensing the product from the vessel upon initiation of a dispense cycle;

emitting an optical signal toward the load beam, wherein the optical signal is reflected from the load beam at an angle determined by a distance between the emitter and the load beam;

receiving the reflected signal at a location based at least in part on the reflected angle of the optical signal;

generating a detector signal corresponding to the location;

receiving the detector signal and determining therefrom a current displacement of the load beam from a reference position;

calculating a current amount of the product dispensed based on the current displacement of the load beam;

comparing the current amount of the product dispensed with a target amount; and stopping the dispensing of the product if the current amount of the product dispensed is within a predetermined threshold of the target amount.

* * * * *